United States Patent [19]

Yabe et al.

[11] Patent Number: 5,132,681

[45] Date of Patent: Jul. 21, 1992

[54] INTELLIGENT SWITCH SYSTEM

[76] Inventors: Ryoichi Yabe, Takashi Yamada, Takayuki Imai, Masahiro Mizutani, all of Japan c/o Shimizu Construction Co., Ltd., 2-16-1, Kyobashi, Chuo-ku, Tokyo 104, Japan

[21] Appl. No.: 739,735

[22] Filed: Jul. 30, 1991

Related U.S. Application Data

[63] Continuation of Ser. No. 483,488, Feb. 22, 1990, abandoned.

[30] Foreign Application Priority Data

Jul. 5, 1989 [JP] Japan ................. 64-173637

[51] Int. Cl.$^5$ ............................................. H04B 1/00
[52] U.S. Cl. .................. 340/825.55; 364/505; 364/550
[58] Field of Search ........... 340/825.06, 825.07, 340/825.15, 825.22, 825.28, 825.29, 825.3, 825.31, 825.34, 825.54, 825.55, 500, 501, 505, 525, 602, 700, 712, 789, 790; 364/138, 505, 512, 188, 506, 550

[56] References Cited

U.S. PATENT DOCUMENTS 4,742,475  5/1988  Kaiser et al. .................. 364/506
4,831,242  5/1989  Englehardt et al. ........... 340/825.31
4,918,615  4/1990  Suzuki et al. .................. 364/138

Primary Examiner—Donald J. Yusko
Assistant Examiner—Dervis Magistre

[57] ABSTRACT

The present invention proposes a system, comprising intelligent switches (1-9), which are embedded on wall surface near entrance on each floor, possessing display unit with touch panel on the front, displaying and outputting the selection menu and the information from the display screen, an information processing unit (10) connected with each of the intelligent switches through the communication line and sending, receiving and processing the information, and the regulatory systems (35-37) in the building. The control signals of the regulatory systems (35-37) in the building are input and the information from the information processing unit (10) is output by the display plate with touch panel (6) of the intelligent switch. According to this system, it is possible to install the intelligent switch system by embedding it in the wall surface near an entrance on each floor, to offer the necessary information such as messages, news, information, etc. and to control the regulatory systems in the building.

8 Claims, 10 Drawing Sheets

```
  0 1 2 3 4 5 6 7 8 9 0 1 2 3 4 5 6 7 8 9 0 1 2 3 4 5
0    NEW INSTALLATION OF COFFEE VENDING
1    MACHINES
2   THE NEW COFFEE VENDING MACHINES HAVE BEEN INSTALLED
3   AT EACH FLOOR. YOU CAN HAVE THE FRESHLY GROUND
4   DRIP COFFEE WITHIN 30 SECONDS.
5      IN ADDITION TO THE BLENDED COFFEE, MOCA AND
6   KILIMANJARO ARE ALSO FURNISHED. TRY A CUP.
7
8
9        BLENDED COFFEE : 100 YEN
0        MOCA           : 120 YEN
1        KILIMANJARO    : 120 YEN
2
3
4
5
```

FIG.7(c)

```
  0 1 2 3 4 5 6 7 8 9 0 1 2 3 4 5 6 7 8 9 0 1 2 3 4 5
0     INFORMATION ON THE NEW YEAR PARTY :
1
2      THE NEW YEAR PARTY WILL BE HELD AS USUAL.
3   PARLOUR TRICKS BY THE NEW STAFFS AND A LARGE NUMBER
4   OF MARVELOUS PRESENTS WILL BE OFFERED AT THE PARTY.
5      FOR FURTHER DETAILS, SEE THE INVITATION CARDS TO
6   BE DISTRIBUTED LATER.
7    DATE : JANUARY 13 (FRIDAY)
8           FROM 18:00
9    PLACE : SHINJUKU L TOWER···HALL
0
1         THE NEW YEAR PARTY EXECUTIVE COMMITTEE
2         ········· ELECTRIC CO.
3
4
5
```

| | |
|---|---|
| 0 | FIVE MILLION DOLLAR BAIL FOR MRS. MARCOS : |
| 1 | FEDERAL JUDGE KEENAN OF NEW YORK FEDERAL DISTRICT |
| 2 | COURT ORDERED MRS. IMELDA MARCOS TO PAY 5 MILLION |
| 3 | DOLLAR BAIL AND PROHIBITED HER TO GO OUT OF NEW YORK |
| 4 | FOR A WHILE. MRS. MARCOS HAD BEEN INDICTED BY FEDERAL |
| 5 | GRAND JURY OF NEW YORK ON SUSPICION OF USURPATION |
| 6 | AND FRAUD. |

| | |
|---|---|
| 0 | CLOSING RATE FOR YEN IN TOKYO : 122:85 YEN |
| 1 | TOKYO FOREIGN EXCHANGE MARKET ENDED THE MORNING TRANSACTION |
| 2 | ON JANUARY 12 WITH THE EXCHANGE RATE OF ONE DOLLAR TO 122.85 |
| 3 | YEN. COMPARED WITH THE CLOSING RATE AT THE LAST WEEK END, |
| 4 | YEN WENT DOWN BY 42 SEN. THE MORNING HIGH WAS 122.70 YEN |
| 5 | AND THE MORNING LOW WAS 123.00 YEN. SPOT EXCHANGE TURNOVER |
| 6 | WAS 4,276 MILLION DOLLARS. THIS IS BECAUSE FOREIGN EXCHANGE |
| 7 | BANKS BOUGHT DOLLAR AS DOLLARS WERE BOUGHT BACK IN NEW |
| 8 | YORK MARKET AT THE LAST WEEK END. EXPORT COMPANIES AND |
| 9 | INSTITUTIONAL INVESTORS REFRAINED FROM SELLING DOLLARS |
| 0 | BECAUSE OF THE ASSUMPTION THAT DOLLAR WILL BE FIRM FOR THE |
| 1 | TIME BEING (FOREIGN EXCHANGE BANK): BECAUSE OF THE DOLLAR |
| 2 | BUYING FOR SETTLEMENT AT WEEK BEGINNING, AND DOLLARS HAVE |
| 3 | BEEN INCREASINGLY BOUGHT. |

> AIR-CONDITIONING ON/OFF
>
> AC
>
> TOUCH THE USER ID (4-DIGIT)
>
> WHEN 4-DIGIT NUMBERS ARE INPUTTED. TOUCH RET.
>
> 0928
>
> 7 8 9
> 4 5 6
> 1 2 3
> 0 RET.

FIG.11(b)

> EXTRA-TIME ON/OFF
>
> AC
>
> GENERAL AFFAIRS DEPT. AND NO.1 SALES DEPT. | NO.2 SALES DEPT. AND PLANNING DEPT.
>
> ALL DEPTS.  +1°C  ±0°C  -1°C

INTELLIGENT SWITCH SYSTEM

This application is a continuation of application Ser. No. 483,488 filed Feb. 22, 1990, now abandoned.

BACKGROUND OF THE INVENTION

The present invention relates to an embedded type intelligent switch system to be mounted on the wall surface near the entrance of an intelligent building or the like and to be used for providing information and for controlling operation of the building facilities.

In intelligent buildings as constructed in recent years, various facilities are furnished such as lighting control, air-conditioning control, entry and exit control, fire detection system, information communication system, etc. and the on-off operation and the control operation for these facilities are performed in each office. For this purpose, various types of switches are installed in the offices such as the switch to turn on or off the lighting equipment, or the air-conditioning systems or the switches to control and adjust the illuminance or the temperature in the rooms. These switches are furnished in separate groups for each partition of the offices and are usually mounted on the wall surfaces near the entrance or at other suitable positions. Therefore, when the offices are partitioned, the positions of the switches are determined according to the partitions.

In the above switch operating system as conventionally adopted, the switches for lighting equipment and the switches for air-conditioning system are separately furnished, and each group of switches and the facilities under control of such switches are limited and fixed in the extent of one-to-one. Namely, the facilities and the extent of the control are limited for each switch, and only one function is provided for such switch.

In the office building, the room partitions and the room layout are frequently changed. When such a change occurs for the conventional switch operating system, the switch group to control the facilities in the same room has to belong partially to the other room after the change. In this case, it is necessary to move a part of the switches to the switch panel of the other rooms. For this reason, the wiring, the switch installation and the rearrangement of the room have to be done each time the room layout is changed.

One of the methods to cope with such a change in a flexible manner is to minimize the re-arrangement by adopting a wireless remote control system. However, the wireless remote control system requires a transmitter and a receiver, and it is also often necessary to divide the transmitter in order to match the room layout. With the increase of the facilities to be controlled, more transmitters or complicated transmitters are needed. This results in the increase of the installation cost of the system and the more troublesome arrangement of the transmitters.

SUMMARY OF THE INVENTION

It is an object of the present invention, to, provide the intelligent switch capable adjusting and controlling the lighting and air-conditioning near the entrance door of an office building so that the facilities and the extent of the area under control can be freely changed. Another object of this invention is to furnish the means to flexibly cope with the change of the office layout. Still another object of the invention is to make up a system where the control command can be input and the information can be output by intelligent switches.

To attain these objects, the intelligent switch system according to the present invention comprises intelligent switches, which are embedded in a wall surface near the entrance on each floor of the building, are capable to output and display the selection menu or the information from the screen of the display unit with a touch panel on the front side thereof and are capable to input the selected instructions. An information processing unit is connected with each of the intelligent switches to give, receive and process the information. A regulatory system is located within the building. The regulatory system in the building is controlled by the intelligent switches and the information is output from the information processing unit. The intelligent switch is provided with a display unit with a touch panel and a data processing device, which displays the menu screen on the display unit with the touch panel and sends the touch input information after recognizing and processing the touch input on the screen. The intelligent switch possesses a top menu consisting of the information offer items and the, intra-building control items, and when an item of the top menu is selected by touch input, the screen is turned to the development screen of the item in order to offer the service for such an item.

With the arrangement as described above, the intelligent switch system of this invention can offer the necessary information by touch input on the intelligent switches, which are embedded in the wall surface near the entrance on each floor and freely control the regulatory systems in the building. Each switch also possesses a top menu consisting of the information offer items and the intra-building control items. When an item of the top menu is selected by touch input, the screen is changed to the development screen of the item and offers the service for such an item. Thus, messages, news and information can be freely offered, and air-conditioning and lighting can be easily controlled by touching the screen.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF PREFERRED EMBODIMENTS

In the following, the embodiments of the invention will be described in connection with the drawings.

Figure 1:
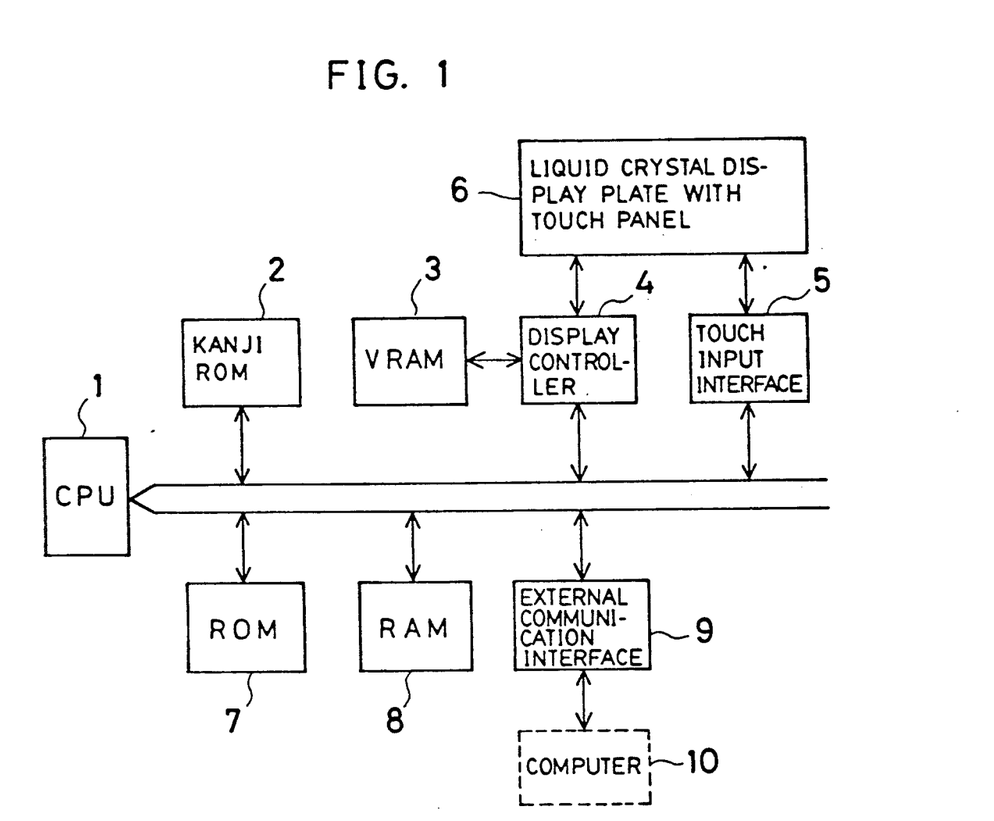
FIG. 1 is a diagram to show an embodiment of an intelligent switch according to the present invention.
Figures 2A, 2B, 2C:
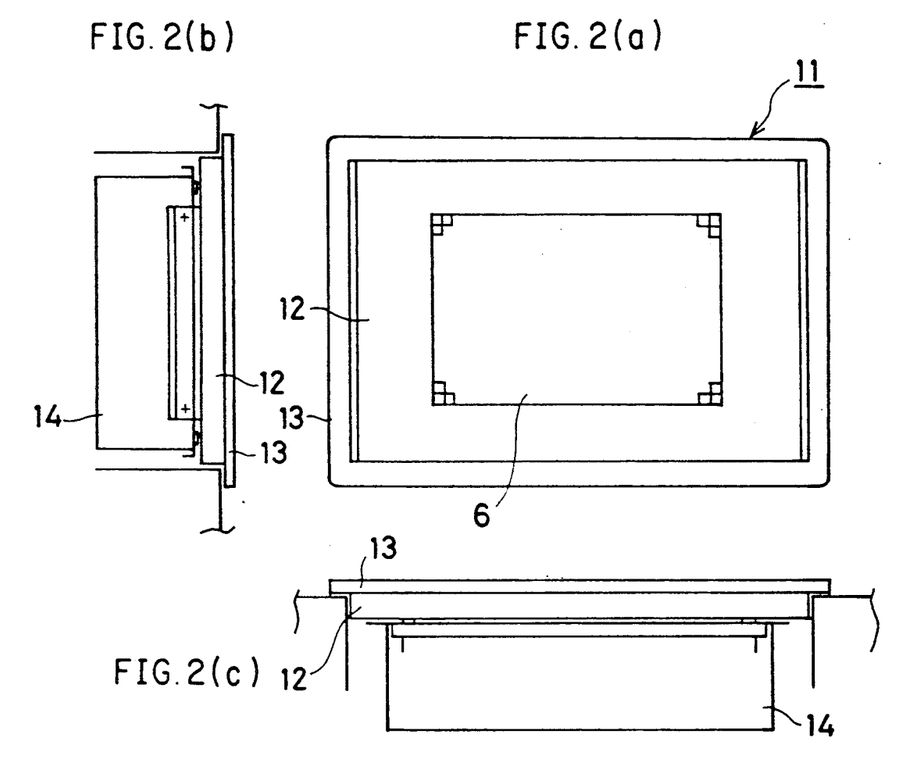
FIG. 2(a)-2(c) are an external view of an intelligent switch.
Figure 3:
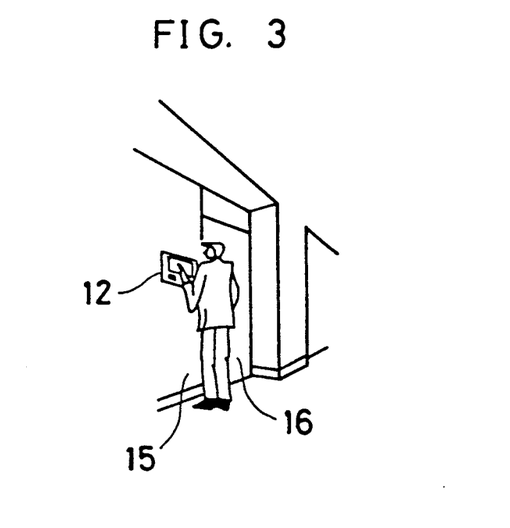
FIG. 3 is an illustration showing the mounting condition of the intelligent switch.

In FIGS. 1, 2 and 3, 1 refers to a CPU, 2 a Kanji ROM, 3 a VRAM, 4 a display controller, 5 a touch input interface, 6 a liquid crystal display plate with a touch panel, 7 a ROM, 8 a RAM, 9 an external communication interface, 10 a computer, 11 an intelligent switch, 12 a front panel, 13 an external frame, 14 an accommodating housing, 15 a mounting wall, and 16 an entrance. The display controller 4 generates Kanji characters and alphanumerics such as JIS No. 1 Standard Kanji, JIS No. 2 Standard Kanji and non-Kanji characters, and develops these characters and patterns on the display screen. The liquid crystal display plate with the touch panel 6 is a liquid crystal display plate furnished with a touch panel on the front thereof. For example, when a liquid crystal display plate commercially available consisting of a screen of 640×400 dots is used, the screen is approximately of B5 size. When this liquid crystal display plate is used to develop and display Kanji characters in 24×24 dots, it is possible to display the information consisting about 16 lines having 26 characters in each line. The touch input interface 5 is to input and process the touch signals from this liquid crystal display plate with the touch panel 6. In ROM 7, the programs such as monitor, communication control, input control of touch panel, display output control, download manager, etc. are stored. RAM 8 is used to store the screen data to be displayed on the liquid crystal display plate with the touch panel 6 and to store the individual program suitable for each application as work area. The screen data and the programs are loaded by the download manager when they are prepared by the other computers. CPU 1 is to process the input/output information on the liquid crystal display plate with the touch panel 6 and to communicate with an external host computer or with the computer 10 such as the building control system through the external communication interface 9 when necessary.

FIG. 2 is an external view of an intelligent switch, in which a circuit of FIG. 1 is accommodated and the liquid crystal display plate with the touch panel 6 is arranged on the front. This intelligent switch 11 is provided with a liquid crystal display plate 6 with the touch panel at the center of the front panel 12, and it is embedded, for example, with the surface of the front panel 12 on the same level as the wall surface, and the external frame 13 is protruded from the wall surface. Because the liquid crystal display plate is of a commercially available thin type, the intelligent switch 12 has the thickness of about 7 cm even when an accommodation housing 14 is furnished on its rear side, accommodating all of CPU 1, Kanji ROM 2, VRAM 3, display controller 4, etc. Accordingly, it is possible to fabricate the intelligent switch 12 in A4 size and to embed it in the wall 15 near the entrance 16.

Next, a description will be given on the building control system, in which the intelligent switch according this invention is used.

Figure 4:
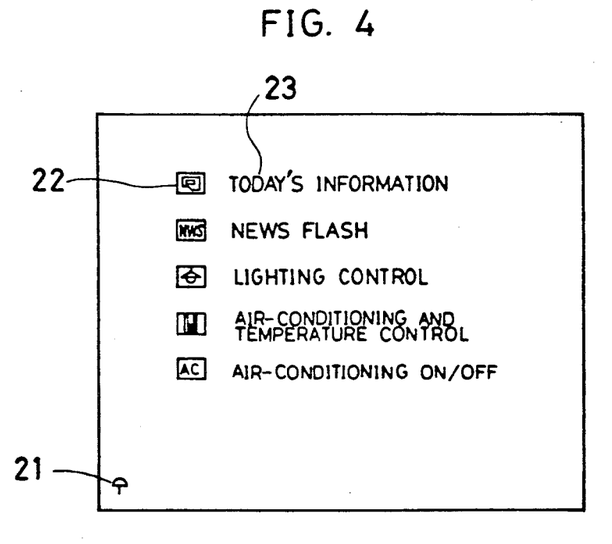
FIG. 4 shows an example of a top menu indicated on a liquid crystal display plate.

On the liquid crystal display plate of the intelligent switch according to this invention, a top menu as shown in FIG. 4 is usually displayed. Icon 21 displays when it is raining, and icon 22 displays the image corresponding to each of the choices 23. By touching the icon 22 or the display area of the choice 23 on this display screen, the touched item is selected, and detailed information is developed and displayed. In this top menu, the information is offered by "Today's information" and "News flash", and the lighting and air-conditioning are controlled and adjusted by "Lighting control", "Air-conditioning and temperature control", and "Overtime air-conditioning ON/OFF".

Figure 5:
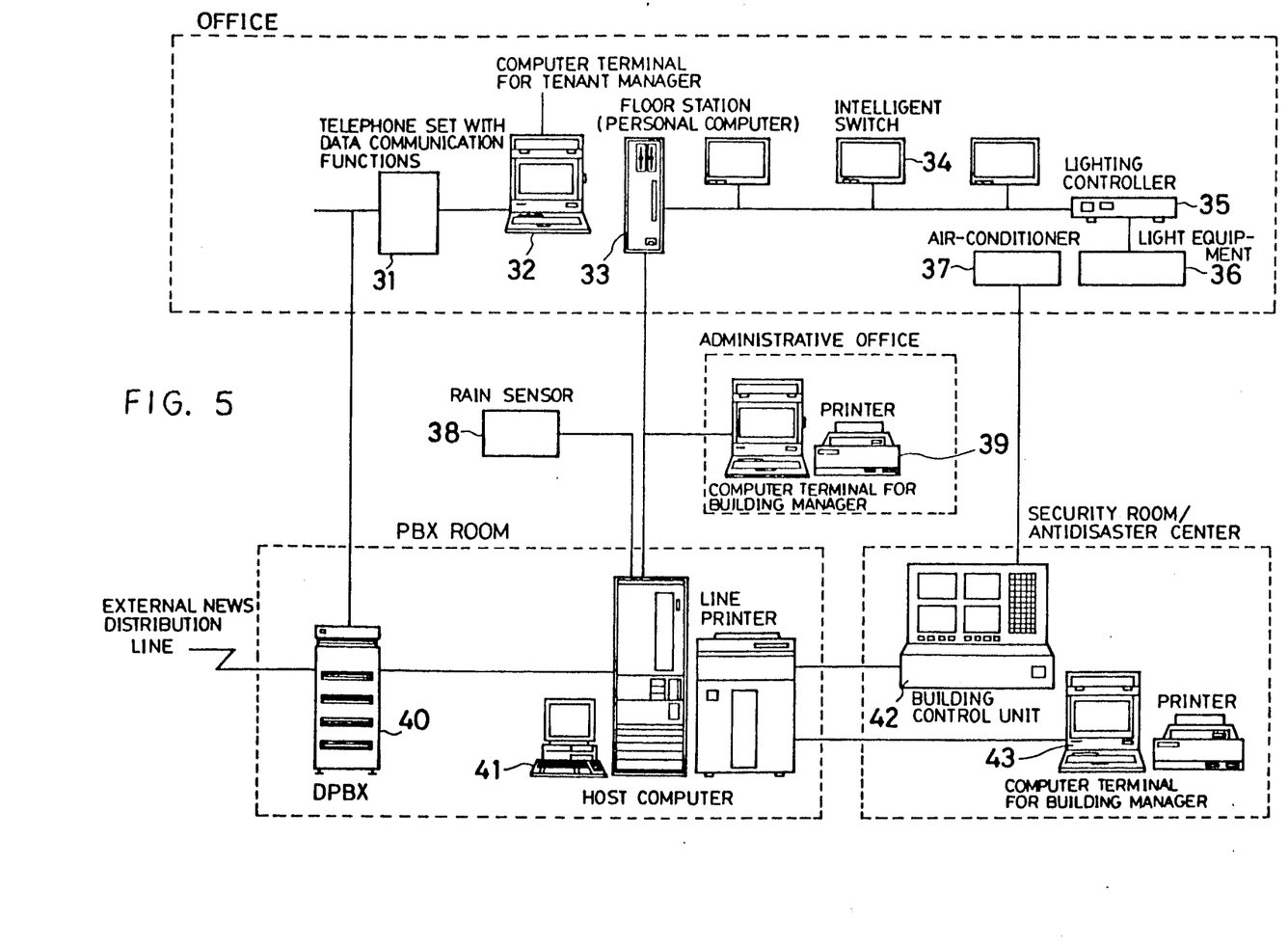
FIG. 5 is a schematical illustration of the configuration of a building control system.

FIG. 5 is an example of the configuration of the building control system, in which the above intelligent switch is mounted on a wall surface near the entrance of a corridor, for example. In this example, the information processing unit consisting of a floor station 33, a host computer 41, a building control system 42, etc. are connected with the intelligent switch 34 through a communication line, and the information is given, taken and processed between these devices and the intelligent switch 34. Further, the intra-building regulator units such as lighting equipment 36, air-conditioner 37, etc. are connected with these devices which provide intra-building regulation control information. The telephone set with data communication function 31 on each floor and the computer terminal for tenant manager 32 are connected with the host computer 41 through DPBX (digital electronic exchange) 40, and the external news distribution line is connected. Also, building control system 42, computer terminals for building managers 43 and 39, floor station 33, and rain sensor 38 are connected. The intelligent switch 34 and the lighting controller 35 are connected with the floor station 33. The lighting equipment 36 is connected with this lighting controller 35, and the air-conditioning system 37 is connected with the building control unit 42. The floor station 33 performs the centralized control of several intelligent switches 34 by multi-task processing, and the intelligent switches 34 are connected by a multi-drop system.

In the lighting control, when ON/OFF status of the lighting is displayed on the liquid crystal display plate of the intelligent switch 34 and the user performs ON/OFF operation of the lighting while watching the screen with the layout display, ON/OFF signals by such an operation are sent from the intelligent switch 34 to the lighting controller 35, and the lighting equipment is controlled. The setting and the change of the lighting control area are achieved by each computer terminal (32, 39, 43) through the floor station 33. In the air-conditioning control, ON/OFF operation of the air-conditioner and fine adjustment of the preset temperature are performed through the display of ON/OFF status and the running status such as the preset temperature. ON/OFF operation, temperature control, area setting and change are achieved from the computer terminal through the building control system 42. In the news flash, the external news distribution line is connected through DPBX, and the most up-to-date news information is taken into the host computer 41. Thus, the latest information can be displayed on the intelligent switch 34. For the rain information, rain sensors 38 are installed on building roof and on the ground, and the umbrella-shaped icon 21 is displayed on each screen of the intelligent switch 34 when it is raining. In buildings, particularly, in large buildings, people inside cannot find out immediately whether it is raining or not outside the building. In such a case, they first become aware of the rain only when they come to the exit of the building, and they have to go back to take rain gear. This means wasting several minutes or more for a large building. The umbrella mark by the icon 21 on the intelligent switch 34 provides convenience in such a case and is very effective to eliminate wasting time when the office workers are going home or going out.

Although not shown in the drawing, a key box for each room may be installed at a specific place in order to check that all keys are returned to key box from each tenant on the floor. Based on the presence or absence of the keys, the lighting and the air-conditioning on each floor may be checked and controlled, and those operating can be stopped when all keys are already there. There are key boxes already known, for each of which a card reader is provided. With the user ID numbers stored in the card reader, the keys with the registered user ID numbers can be freely taken away or given back, and this facilitates the key control.

Figure 6:
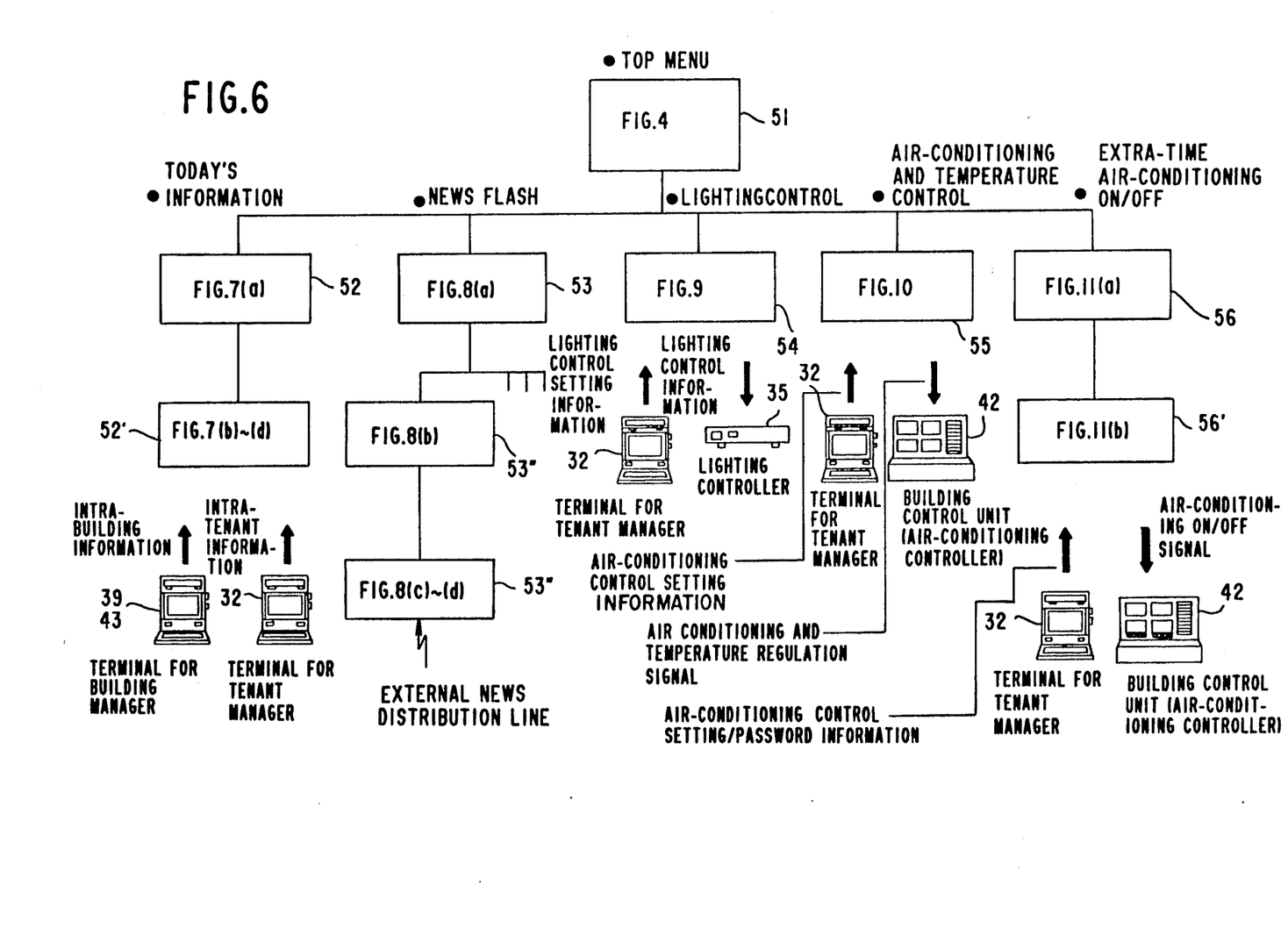
FIG. 6 is a diagram to give an example of screen configuration.
Figure 7A:
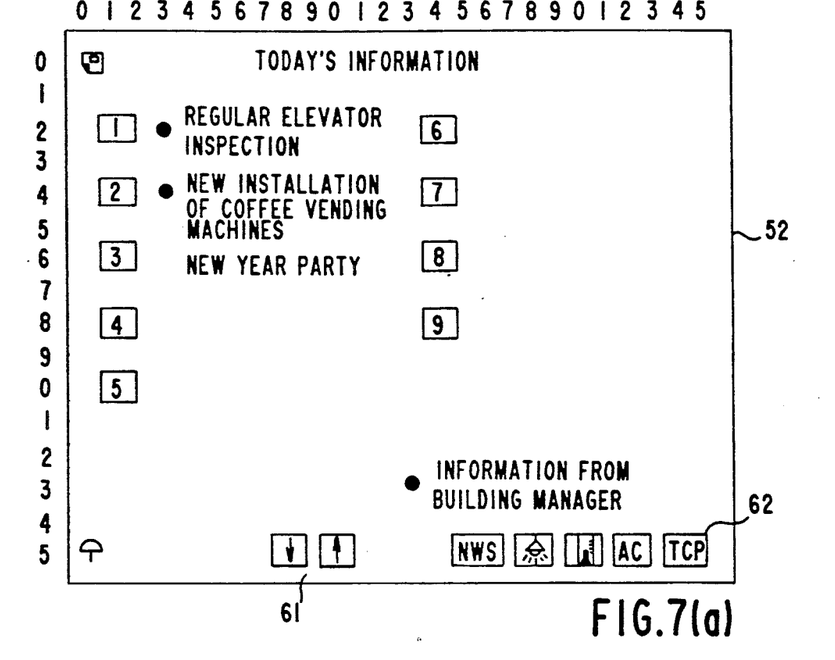
FIGS. 7a-d, 8a-d, 9 to FIG. 11 are the examples of the development screen of each menu.
Figure 7B:
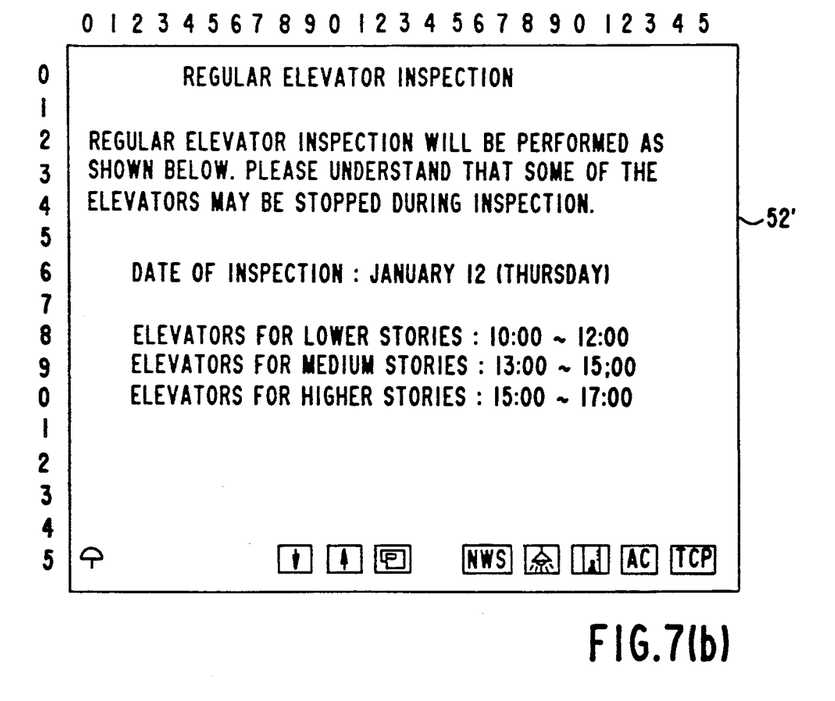
Figure 7C:
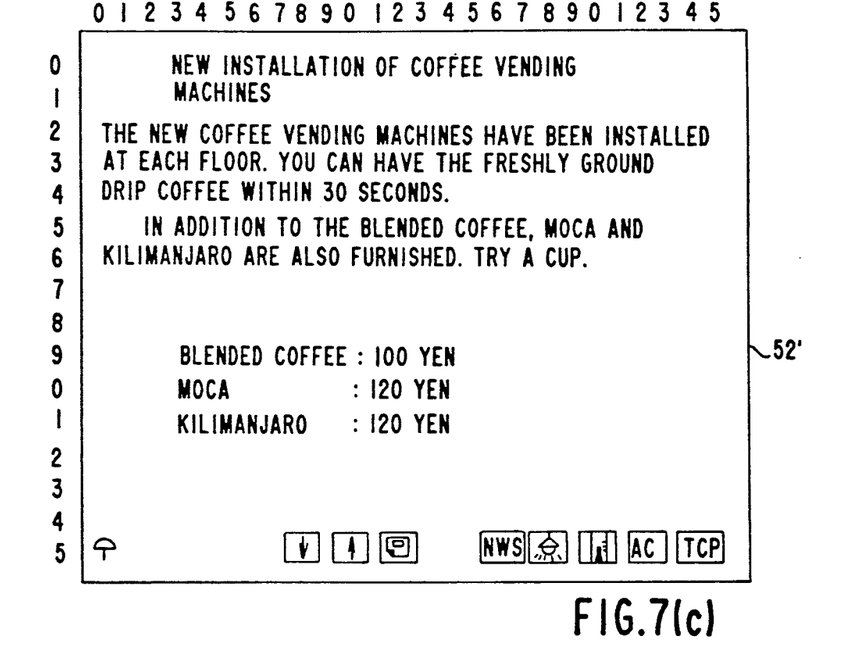
Figure 7D:
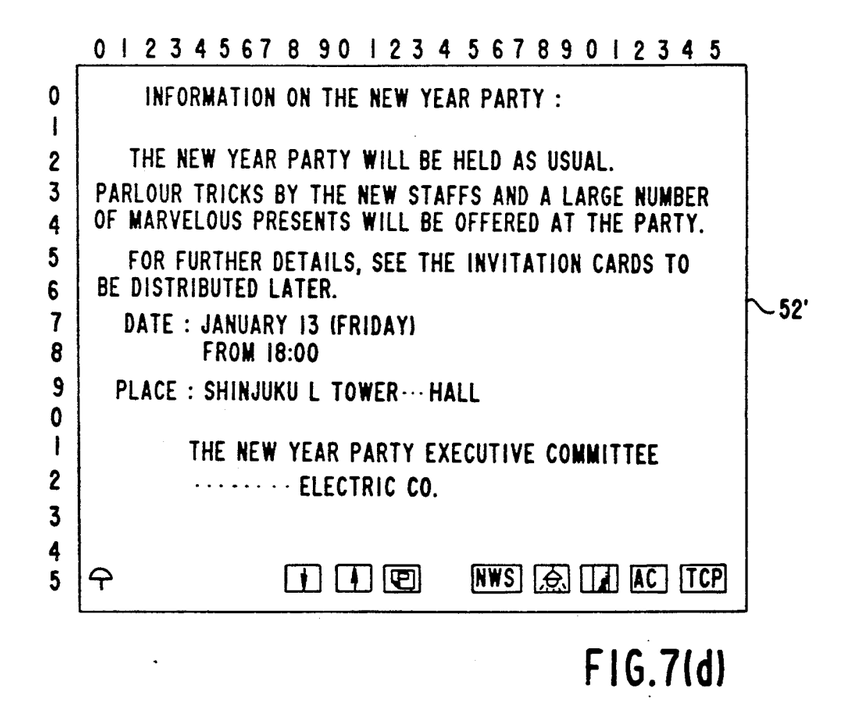
Figure 8A:
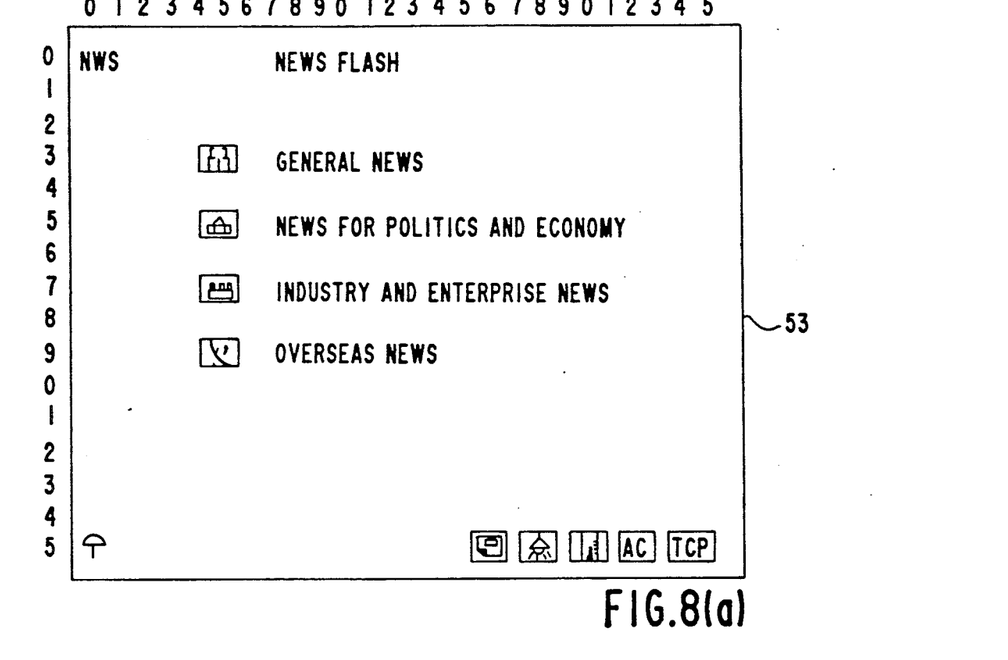
Figure 8B:
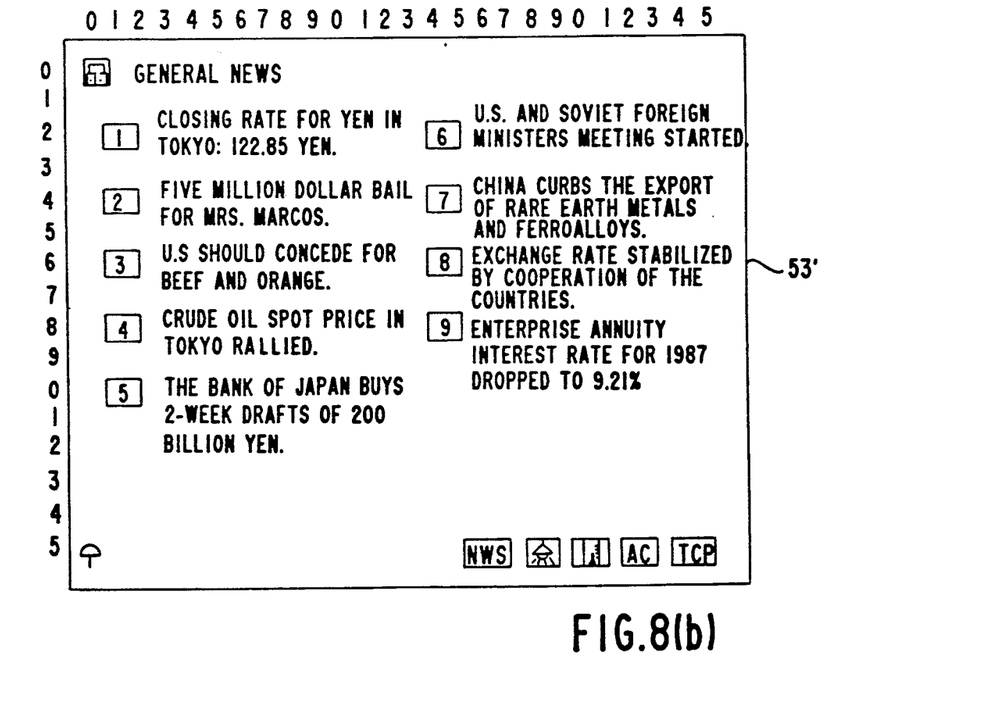
Figure 8C:
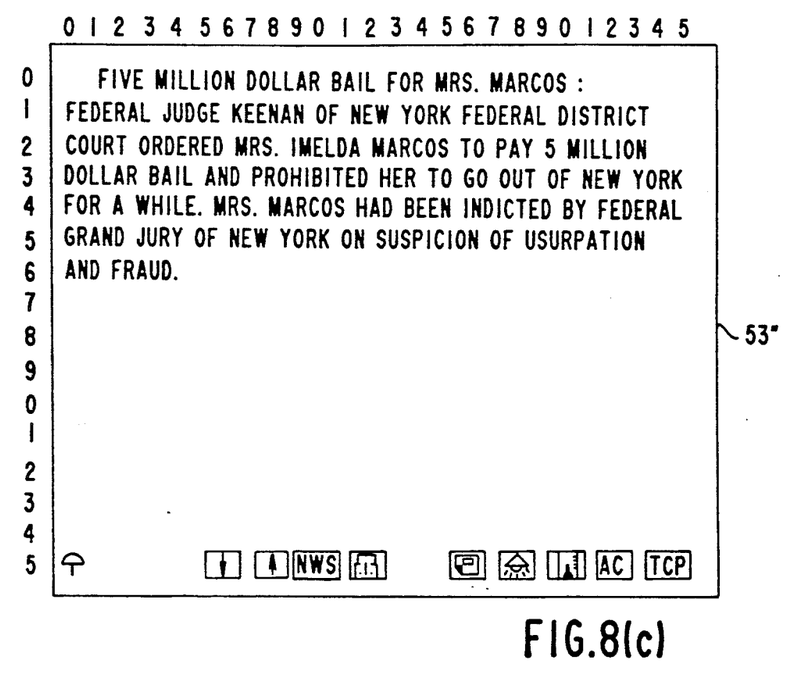
Figure 8D:
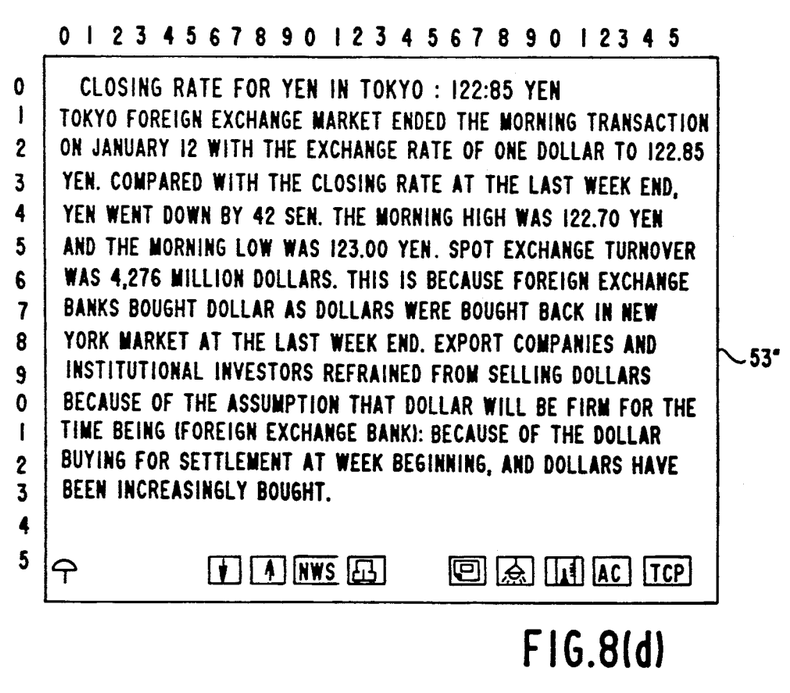

Next, a description will be given on the screen configuration of the intelligent switch as well as the selection and the changeover of the switch. Normally, the top menu screen 51 is displayed, but when any of the choices "Today's information", "News flash", "Lighting control", "Air-conditioning and temperature control", "Air-conditioning ON/OFF", etc. is selected by touch input, the screen is turned to the menu screens 52-56 as shown in FIG. 6.

For example, in the menu screen 52 of "Today's information", the menu such as "Regular inspection of elevator", "New installation of coffee vending machine", "Information about New Year's party", etc. including the message from the building manager or the tenant manager are displayed as given in FIG. 7 (a). If any of these items is selected, the screen 52' for the detailed information corresponding to each selection item is displayed as shown in FIGS. 7 (b)-(d). The information is input from the computer terminal of the building manager 39 or 43 and the computer terminal of the tenant manager 32.

As described above, each of the menus for item selection is displayed on the menu screens 52-56. When there are two or more pages of screens, the next page key and the preceding page key 61 to select these screens or the menu screen selection key 62 to select the other menu screen are displayed at the end of the screen.

On the menu screen 53 of "News flash", the category (genre) selection menu such as "General news", "Political and economic news", "Industry and enterprise news", "Overseas news", etc. is displayed as shown in FIG. 8 (a). When the category is selected, the menu for the selection items is displayed as given in FIGS. 8 (c) and (d). Such "news flash" is usually wanted at lunch time for a normal office building (i.e., the most frequently used display). Accordingly, if the schedule is controlled (i.e., by a schedule control function) in such a manner that the menu screen 53 of "News flash" is displayed instead of the top menu during lunch time, the desired information becomes available through the least number of selection steps.

Figure 9:
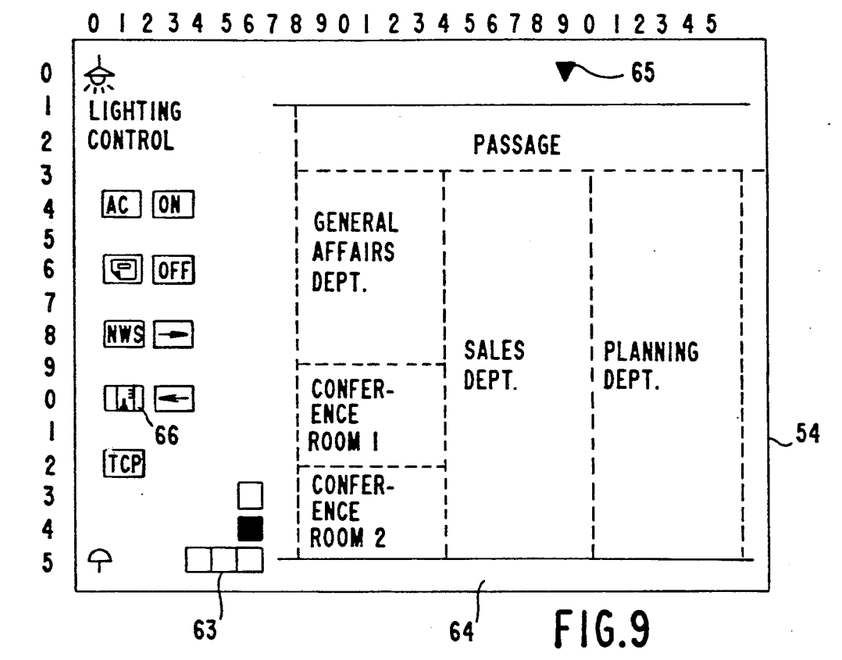

On the menu screen 54 of "Lighting control", various selection keys 66 are displayed together with the floor layout 63 or the controlled area layout 64 as given in FIG. 9. In the floor layout 63, the position of the layout for the controlled area is emphatically displayed. In the layout for the controlled area 64, ON/OFF status display of each block area and the installed position display 65 of the intelligent switch are displayed. The menu screen selection key and the shift key, ON/OFF operation key, etc. are included in these selection keys 66. The controlled area is shifted by each block, and the scope of shift is limited for each tenant. ON/OFF operation may be performed in such a manner that it is turned OFF when it is in an ON status and it is turned ON when it is in an OFF status by touching each block area instead of ON/OFF operation key. By this touch input, the signals for the lighting control are issued. The layout for the controlled area can be changed by minimum operation of ON/OFF control.

Figure 10:
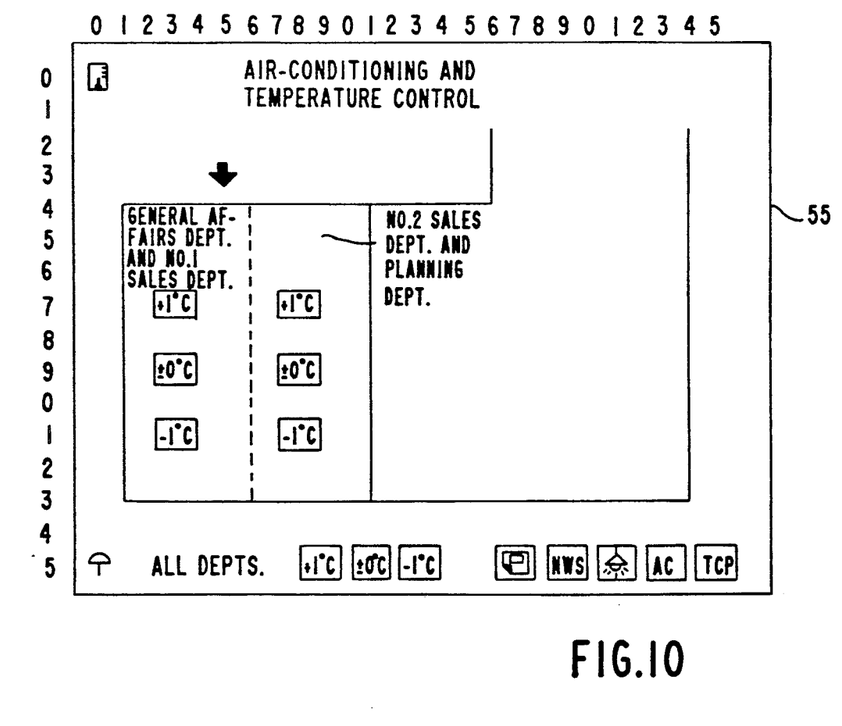

In the menu screen 55 of the "Air-conditioning temperature control", the temperature control keys for each room of the entire building are displayed on screen together with the layout as shown in FIG. 10. When the key on the screen is touched, the information of that key, i.e. the control signal, is issued. In the figure, the standard temperature as set at the center can be adjusted by ±1° C., and the regulation for all tenants is achievable by the whole building regulation key. Individual regulation is performed by each key for each room.

Figure 11A:
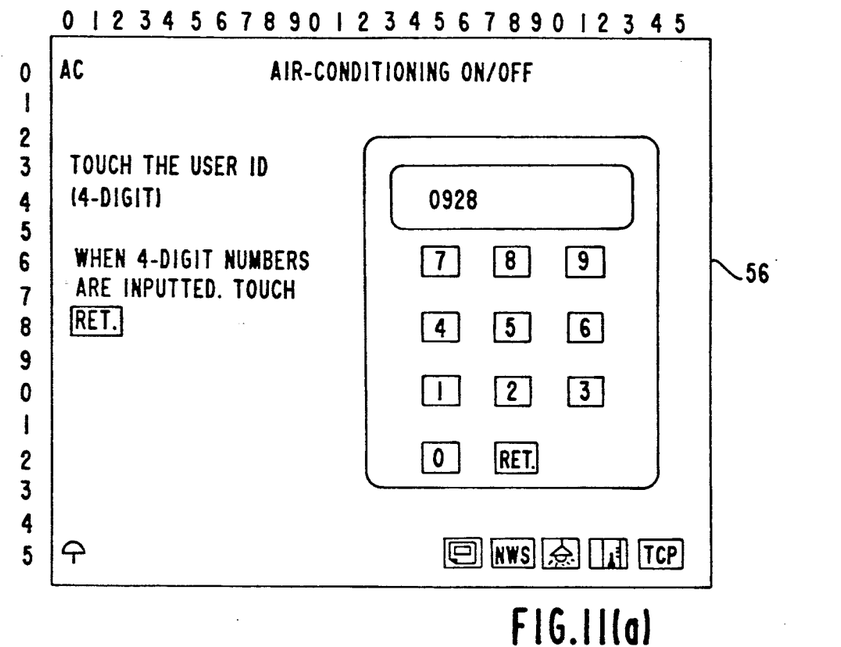
Figure 11B:
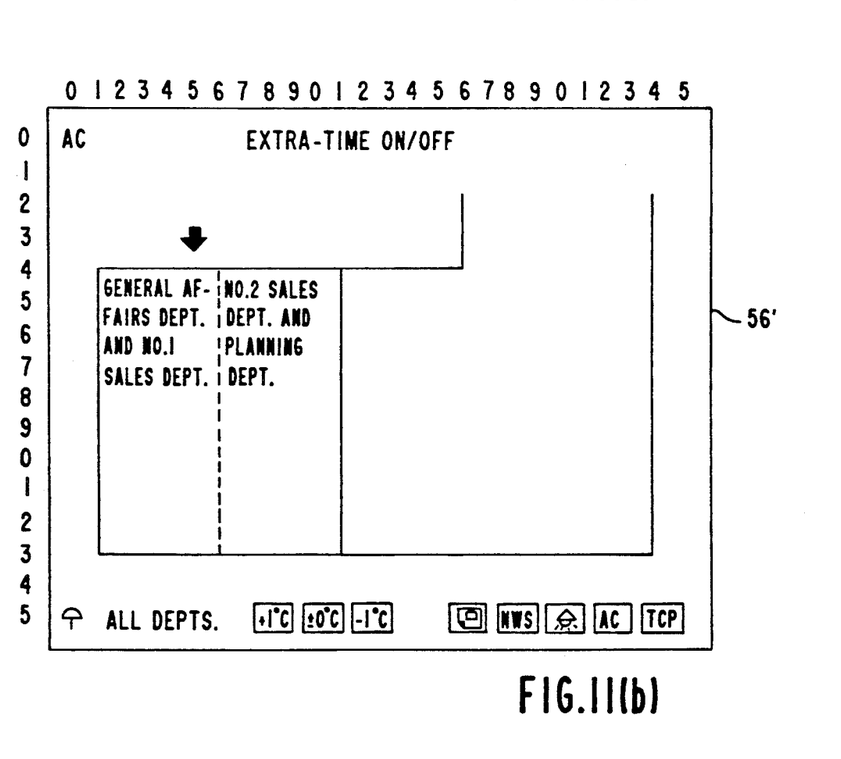

In the menu screen of the "Air-conditioning ON/OFF", the user ID input screen by ten-key is displayed as given in FIG. 11 (a). When the user ID number is input, the user ID number is collated, and the layout screen 56' where the overtime ON/OFF operation can be input is displayed.

As described above, the present invention offers an intelligent switch, which comprises a display unit with touch panel on the front thereof and a data processing unit, and in which the top menu consisting of the information offer items such as "Today's information" or "News flash" and the intra-building control items such as "Lighting control", "Air-conditioning temperature control", "Overtime air-conditioning ON/OFF", etc. is displayed, and these items are developed according to each selection. Because the screen is changed over and the input information is processed by the menu display and the touch on the displayed area, the registration and the change of the screen and the change of the touch area can be accomplished freely from computer terminals, and a compact and flexible system can be provide. For example, the information can be input or the lighting block or the air-conditioning block can be set from the computer terminal of each manager, and when the contents are registered in the host computer, these are transferred to each intelligent switch and building control system through the floor station and are processed at the intelligent switches and the building control system according to each content.

It is naturally obvious that the present invention is not limited to the above embodiment, and various modifications and changes are conceivable. For example, liquid crystal display plate is used in the above embodiment, but the other types of display may be employed. Also, 5 items are displayed in the top menu, whereas statistical data, message or other information may be displayed, and the items may be increased such as electric key control or other facility control. Further, if there is no touch input on the liquid crystal display plate with the touch panel within the predetermined time, the backlight automatic light-out function by time-out or automatic light-on function by screen touch is executed. The schedule control function may be furnished to display the most desired screen for each time zone, e.g., instead of top menu screen, the menu for "Lighting control" may be displayed in the morning, and the menu for "News flash" at lunch time so that the most desired screen may be displayed.

As it is evident from the above explanation, the menus are hierarchically displayed on the display unit with touch panel according to this invention, and the information is offered or building facilities are controlled by touch input. This makes it possible to use the system as multi-function terminals and to provide a wide variety of information. Moreover, external information or internal liaison information can be quickly and abundantly offered near the entrance of each room. Also, because input is performed from the screen, the switching system can be easily changed by altering the screen without rearranging the wiring system. This means more flexible action when office layout is changed. The operation is simple, maloperation rarely occurs, and, even when it occurs, it can be easily identified. Further, because display is made hierarchically, dividing into two or more screens, a number of functions can be provided with the system in compact size.

What we claim is:

1. An intelligent switch system, comprising:
   intelligent switches, embedded inside a wall surface near an entrance on each floor of a building and each said intelligent switch possessing a display unit having a touch panel on a front surface thereof, said display unit displaying and outputting a selection menu and information from a display screen based on time of day, a schedule control function is furnished for the display screen to give priority in displaying a most frequently used display of said selection menu, said most frequency used display determined based on said time of day;
   a regulatory system regulating facilities in the building; and
   an information processing unit connected with each of the intelligent switches through a communication line, said information processing unit sending, receiving and processing information from said intelligent switches, the information processing unit controls the regulatory system in the building and outputs information about the regulatory system and information not related to the regulating system using instructions input from the intelligent switches.

2. An intelligent switch system as set forth in claim 1, wherein the intelligent switch displays the selection menu on the display unit having the touch panel and each intelligent switch is provided with a data processing means which outputs touch input information on said display screen, said intelligent switch possesses a top menu consisting of information items and intra-building regulation control items, when an item of said top menu is selected by touch input, the display screen is changed over to a detailed description about said item and service for each item is displayed.

3. An intelligent switch system as set forth in claim 1, wherein icons and selection items are displayed on the display screen as choices of said selection menu.

4. An intelligent switch system as set forth in claim 1, wherein rain sensors are installed on said building, and rain information obtained from said rain sensors is displayed on said display screen.

5. An intelligent switch system as set forth in claim 1, wherein said information processing unit is connected with a news distribution line external to the building and news is offered as one choice of the selection menu.

6. An intelligent switch system as set forth in claim 1, wherein the display screen is displayed according a block area of a floor layout, and regulation control information can be input to said intelligent switches based on said block area.

7. An intelligent switch system as set forth in claim 1, wherein a multi-task floor station is installed on each floor of the building for general control of the intelligent switches.

8. An intelligent switch system as set forth in claim 1, wherein the display unit with the touch panel of the intelligent switch is turned off when no touch input is input within a predetermined period of time and backlight is controlled to turn on by touch input.

* * * * *

UNITED STATES PATENT AND TRADEMARK OFFICE
CERTIFICATE OF CORRECTION

PATENT NO. : 5,132,681

DATED : July 21, 1992

INVENTOR(S) : YABE et al

It is certified that error appears in the above-identified patent and that said Letters Patent is hereby corrected as shown below:

On the title page, the assignee data should read as follows:

--[73] Assignee: Shimizu Construction Co., Ltd.,
2-16-1, Kyobashi, Chuo-ku, Tokyo
104 Japan--.

Signed and Sealed this

Twenty-third Day of November, 1993

Attest:

BRUCE LEHMAN

Attesting Officer

Commissioner of Patents and Trademarks